US006544941B1

(12) United States Patent
Lee et al.

(10) Patent No.: US 6,544,941 B1
(45) Date of Patent: Apr. 8, 2003

(54) DISHWASHING COMPOSITION

(75) Inventors: Christine Marie Nixon Lee, Fort Lee, NJ (US); Naresh Dhirajlal Ghatlia, Rutherford, NJ (US)

(73) Assignee: Unilever Home & Personal Care USA, division of Conopco, Inc., Greenwich, CT (US)

(*) Notice: Subject to any disclaimer, the term of this patent is extended or adjusted under 35 U.S.C. 154(b) by 0 days.

(21) Appl. No.: 09/939,926

(22) Filed: Aug. 27, 2001

(51) Int. Cl.[7] ............................ C12S 9/00; C11D 3/00; C11D 7/42

(52) U.S. Cl. ....................... 510/392; 510/220; 510/221; 510/226; 510/229; 435/264

(58) Field of Search ................................ 510/220, 221, 510/226, 229; 435/264

(56) References Cited

U.S. PATENT DOCUMENTS

| | | | | |
|---|---|---|---|---|
| 4,511,490 A | | 4/1985 | Stanislowski et al. | 252/174.12 |
| 5,679,630 A | * | 10/1997 | Baeck et al. | 510/305 |
| 5,719,112 A | | 2/1998 | Gordon et al. | 510/226 |
| 5,811,112 A | * | 9/1998 | Chandar et al. | 424/401 |
| 6,197,739 B1 | | 3/2001 | Oakes et al. | 510/392 |
| 6,287,585 B1 | * | 9/2001 | Johansen | 424/405 |

FOREIGN PATENT DOCUMENTS

| | | |
|---|---|---|
| WO | 00/60042 | 10/2000 |

* cited by examiner

*Primary Examiner*—Yogendra N. Gupta
*Assistant Examiner*—Preeti Kumar
(74) *Attorney, Agent, or Firm*—Ronald A. Koatz

(57) ABSTRACT

A dishwashing composition for removing protein soils is described. The dishwashing composition has a serine protease and a metallo-protease and displays protein soil removal when applied to soiled utensils in domestic, industrial and hand dishwashing cleaning applications.

15 Claims, No Drawings

DISHWASHING COMPOSITION

FIELD OF THE INVENTION

The present invention is directed to a dishwashing composition. More particularly, the invention is directed to a dishwashing composition comprising an enzyme mixture. The enzyme mixture comprises serine protease and metallo-protease, and the dishwashing composition formulated with the same unexpectedly displays excellent protein soil removal in both domestic and industrial dishwashing applications.

BACKGROUND OF THE INVENTION

Traditional domestic and industrial dishwashing compositions rely on a combination of high alkalinity detergent washes and chlorine bleach for cleaning and sanitizing dishware. Such systems perform well on bleachable stains; however, they can be deficient at removing protein-comprising soils like those often found on dishware in domestic kitchens, hospitals, cafeterias, catering industries and the like. In addition, such highly alkaline and chlorine-containing compositions are not considered consumer or environmentally friendly.

Attempts have been made to create dishwashing compositions that are effective at handling protein-comprising soils. These compositions typically employ proteases under alkaline conditions (e.g., pH of at least 9.5). Such compositions, however, have a significant drawback in that they are difficult to formulate in liquid or gel form. This is true because alkaline conditions are known to destroy enzyme stability in compositions that are in the liquid or gel form. Additionally, alkaline dishwashing compositions can be classified as irritants and thus not consumer friendly.

Other attempts have been made to create low pH (e.g., pH less than 9.5) dishwashing compositions. These compositions are safer, environmentally friendly and capable of being made in liquid or gel form. However, dishwashing compositions of low pH have proven to be very ineffective at removing protein-comprising soils, even when high amounts of enzymes, such as proteases, are formulated within the compositions.

It is of increasing interest to develop a dishwashing composition that nay be in the form of a powder, tablet, liquid, paste or gel and that displays excellent protein-comprising soil removal in both domestic and industrial dishwashing applications. Moreover, it is desirable to develop a dishwashing composition that is a safer, environmentally friendly and effective at removing protein-comprising soils. This invention, therefore, is directed to a dishwashing composition that unexpectedly displays superior protein-comprising soil removal, even at pH levels that are conducive to enzyme stability in liquids.

ADDITIONAL INFORMATION

Efforts have been disclosed for making stable enzyme systems. In U.S. Pat. No. 4,511,490, cooperative enzymes comprising alkaline or mixtures of alkaline and neutral proteases, in the absence of stabilizers, are shown.

Other efforts have been disclosed for making dishwashing compositions. In U.S. Pat. No. 5,719,112, a dishwashing composition comprising lipase and a hydrophobically modified (co)polymer of acrylic acid is described.

Even further, attempts have been made to make proteolytic enzyme cleaners. In U.S. Pat. No. 6,197,739, compositions for use as soil removing agents in the food processing industry are disclosed.

In WO 00/60042, detergent compositions with a metello-protease are disclosed wherein the metallo-protease has more than 15 AU/mg of caseinolytic activity.

None of the references above describe a dishwashing composition with an enzyme mixture having a serine protease and a metallo-protease that unexpectedly displays excellent protein soil removal in both domestic and industrial dishwashing applications.

SUMMARY OF THE INVENTION

In a first aspect, the present invention is directed to a dishwashing composition effective at removing protein-comprising soils, the dishwashing composition comprising:

(a) a serine protease; and (b) a metallo-protease.

In a second aspect, the present invention is directed to a method for cleaning soiled items (e.g., removing protein-comprising soils) whereby the method uses the dishwashing composition of the first aspect of this invention.

In a third aspect, the present invention is directed to a low pH dishwashing composition effective for removing protein-comprising soils.

Dishwashing as used herein, can include machine or automatic dishwashing, industrial warewashing and hand dishwashing.

DETAILED DESCRIPTION OF THE PREFERRED EMBODIMENTS

There is generally no limitation with respect to the serine protease that may be used in this invention other than that the serine protease is one which may be used in a dishwashing composition. Such proteases are typically derived from *Bacillus amyloliquefaciens, Bacillus licheniformis, Bacillus lentus* (alcalophilus), and *Bacillus subtilis*. Other serine proteases which may be used in this invention include those which may be derived from the visceral organs of animals, like the yellowfin tuna, and from vegetables (e.g., cruciferous vegetable abstracts) like broccoli. Often, the serine protease which is used in this invention is selected from the group consisting of chymotrypsin, trypsin, subtilisin and mixtures thereof.

The serine proteases which may be used in this invention include Novozymes A/S enzymes sold as Alcalase, Esperase, Savinase, and Relase. Subtulisin BPN and BPN' may also be used, as well as Maxatase and Maxapem 15, Properase, Purafect, and Purafect Ox, all of which are made commercially available from suppliers like Genencor International. Other serine proteases which may be used in this invention include those described in U.S. Pat. Nos. 6,207,631, 5,470,733 and 5,030,378, and WO 01/44452, the disclosures of which are incorporated herein by reference.

It is particularly noted herein, therefore, that serine proteases classified as I-S1 and I-S2 proteases can be used in the dishwashing composition of this invention. Moreover, protein engineered versions (i.e., "derivatives" having amino acid insertions, deletions or substitutions or a combination thereof) of the serine proteases described herein may also be used in the dishwashing compositions of this invention. Preferred serine proteases which may be used in this invention include those made available by Novozymes A/S and sold under the name Savinase, Relase, Properase and Purafect. Especially preferred serine proteases which may be used in this invention are selected from the above-described and are those having a maximum activity at an alkaline pH, whereby alkaline pH is a pH from about 7.0 to about 11.5, and preferably, from about 7.5 to about 11.0, and most preferably, from about 8.0 to about 11.0, including all ranges subsumed therein.

The metallo-protease that may be used in this invention includes any of those which may be used in a dishwashing composition. These metallo-proteases are, for example, derived from bacterium selected from the group consisting of *bacillus amyloliquefaciens, bacillus subtilis, bacillus stearothermophilus* and *bacillus thermoproteolyticus*, and fungi selected from the group consisting of *Aspergillus oryzae* and *Aspergillus niger.*

Such metallo-proteases are made commercially available from suppliers like Novozymes A/S, Röhm Enzyme, Godo Shusei Co., Ltd., Solvay Enzymes, Genencor International, and Amano Pharmaceutical Co., Ltd. The metallo-proteases are sold under the names Neutrase, Corolase (Corolase 7089 being especially preferred), Godo-BNP, HT Proteolytic, Panazyme, Veron PS, and Fungal Protease P. Especially preferred metallo-proteases which may be used in this invention are those selected from the above-described and are those having a maximum activity at a pH from about 5.0 to about 10.0, and preferably, from about 5.5 to about 9.5, and most preferably, from about 6.0 to about 9.0, including all ranges subsumed therein. Furthermore, similar to the serine protease that may be used in this invention, it is within the scope of the invention to use protein engineered versions (i.e., "derivatives" having amino acid insertions, deletions or substitutions or a combination thereof) of the above-described metallo-proteases.

The total amount of active protease employed in this invention (i.e., total amount of serine protease and metallo-protease) is from about 0.0001 to about 5.0%, and preferably, from about 0.0002 to about 3.0%, and most preferably, from about 0.0003 to about 2.0% by weight enzyme, based on total weight of dishwashing composition, including all ranges subsumed therein. Moreover, the enzyme activity of the metallo-protease used in this invention is often from about 0.001 to less than 15 AU/mg, and preferably, from about 0.002 to about 8.0 AU/mg, and most preferably, from about 0.003 to about 2.0 AU/mg, based on caseinolytic activity, and including all ranges subsumed therein.

Regarding the amount (weight of active enzyme) or ratio (based on active enzyme) of serine protease-to-metallo-protease used in the dishwashing composition of the present invention, usually the ratio is from about 300:1 to about 1:300, and preferably, from about 150:1 to about 1:150, and most preferably, from about 75:1 to about 1:75. In an especially preferred embodiment, the measured specific activity of the combined enzymes employed in this invention is less than or equal to the actual sum of the individual measured specific activities.

Preferred additives that may be used in the dishwashing compositions of this invention include polymers having a positive charge. As used in this invention, a polymer comprising a positive charge is defined to mean an entity prepared from at least two monomeric units whereby at least one monomeric unit comprises a positive charge. There generally is no limitation with respect to the type of polymer comprising a positive charge that may be used in this invention other than that the positively charged polymer can be used in a dishwashing composition. Such a polymer comprising a positive charge often has a weight average molecular weight of greater than about 2,000; and preferably, greater than about 3,000; and most preferably, greater than about 4,000.

The polymer comprising a positive charge which may be used in this invention is typically soluble or dispersible to at least the extent of 0.01% by weight in distilled water at 25° C. Such a positively charged polymer includes polymers in which one or more of the constituent monomers maintains a positive charge in solution over a portion of the pH range 2–11. A partial listing of the monomers which may be used to make the polymers in this invention are presented in "Water-Soluble Synthetic Polymers: Properties and Behavior, Volume II", by P. Molyneux, CRC Press, Boca Raton, 1983, ISBN 0-8493-6136, the disclosure of which is incorporated herein by reference. Additional monomers can be found in the "International Cosmetic Ingredient Dictionary, 5th Edition", edited by J. A. Wenninger and G. N. McEwen, The Cosmetic, Toiletry, and Fragrance Association, Washington D.C., 1993, ISBN 1-882621-06-9, the disclosure of which is incorporated herein by reference. A third source of such monomers can be found in "Encyclopedia of Polymers and Thickeners for Cosmetics", by R. Y. Lochhead and W. R. Fron, Cosmetics & Toiletries, vol. 108, May 1993, pages 95–135, the disclosure of which is also incorporated herein by reference.

Often, preferred monomers useful to make the polymers comprising a positive charge in this invention may be represented structurally as ethylenically unsaturated compounds having the formula:

(I)

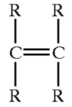

wherein each R is independently a hydrogen, derivatized hydroxy, $C_1$ to $C_{30}$ straight or branched alkyl group, aryl, aryl substituted $C_{1\text{-}30}$ straight or branched alkyl radical, or a polyoxyalkene condensate of an aliphatic moiety, a heteroatomic organic group comprising at least one positively charged group without a charged nitrogen, quaternized nitrogen atom or at least one amine group comprising a positive charge over a portion of the pH interval 2 to 11, with the proviso that at least one R group is a heteratomic organic group that has a positive charge without a charged nitrogen, a quaternized nitrogen atom group or an amine group comprising a positive charge. Such amine groups can be further delineated as having a $pK_a$ of about 6 or greater, as defined by R. Laughlin in "Cationic Surfactants, Physical Chemistry", edited by D. N. Rubingh and P. M. Holland, Marcel Dekker, New York, 1991, ISBN 0-8247-8357-3. Moreover, it is further noted herein that salts of the monomers represented by formula I may also be used to make the polymers comprising the positive charge in this invention.

Examples of monomers comprising a positive charge as depicted by formula I include, but are not limited to, 2-vinylpyridine and its 2-vinyl N-alkyl quaternary pyridinium salt derivatives; 4-vinylpyridine and its 4-vinyl N-alkyl quaternary pyridinium salt derivatives; 4-vinylbenzyltrialkylammonium salts such as 4-vinylbenzyltrimethylammonium salt; 2-vinylpiperidine and 2-vinyl piperidinium salt; 4-vinylpiperidine and 4-vinylpiperidinium salt; 3-alkyl 1-vinyl imidazolinium salts such as 3-methyl 1-vinylimidazolinium salt; acrylamido and methacrylamido derivatives such as dimethyl aminopropylmethacrylamide, and methacrylamidopropyl trimethylammonium salt; acrylate and methacrylate derivatives such as dimethyl aminoethyl (meth)acrylate, ethanaminium N,N,N trimethyl 2-[(1-oxo-2 propenyl)oxy]-salt, ethanaminium N,N,N trimethyl 2-[(2 methyl-1-oxo-2 propenyl)oxy]-salt, and ethanaminium N,N,N ethyl dimethyl 2-[(2 methyl-1-oxo-2 propenyl)oxy]-salt. Also included among the monomers suitable to make the polymers with a positive charge employable in this invention are vinyl amine and vinylammonium salt; diallylamine, and methyldiallylamine.

Also, if desired, monomers containing cationic sulfonium salts such as 1-[3-methyl-4-(vinyl-benzyloxy)phenyl] tetrahydrothiophenium chloride may also be used to make the polymers comprising the positive charge of this invention.

The preferred polymers comprising a positive charge that may be used in this invention are derived from the polymerization of diallyldimethylammonium salts, having the chemical structure as unpolymerized or polymerized monomer, respectively, of formula II or III:

(II)

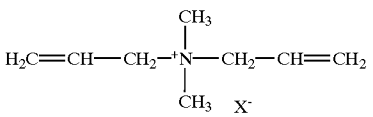

or (III)

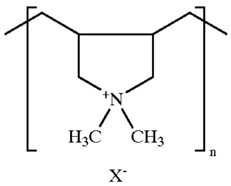

wherein n and X are as previously defined.

Still other preferred polymers comprising a positive charge employable in this invention include those polymerized from acrylamidopropyl trimethylammonium salt. Examples of the former preferred polymers are made commercially available by Nalco under the name Merquat Plus 3331. Examples of the latter polymers are developed by Rohm & Haas under the name PC2.

There is no limitation with respect to the amount of polymer with a positive charge that may be used in this invention other than that the amount used results in a dishwashing composition. Typically, however, from about 0.1 to about 10.0, and preferably, from about 0.2 to about 7.0, and most preferably, from about 0.3 to about 5.0% by wt. of the dishwashing composition is a polymer comprising a positive charge, based on total weight of the dishwashing composition, including all ranges subsumed therein.

In general, the polymers comprising the positive charge which may be used in this invention are typically made commercially available from suppliers like Nalco and Rohm & Haas. The monomers used to make the polymers having a positive charge may be provided by suppliers like Aldrich and Sigma. Such polymers may also be prepared via conventional reactions which include free radical polymerizations. Other polymers comprising a positive charge that may be used in this invention include those described in U.S. Pat. No. 6,239,091, the disclosure of which is incorporated herein by reference.

Along with, but preferably in lieu of the polymers comprising the positive charge, a hydrophobically modified polycarboxylic acid may be used in the dishwashing composition of this invention.

As used in this invention, a hydrophobically modified polycarboxylic acid is defined to mean a compound, oligomer or polymer having at least one carboxylic acid group and at least one group that is not water soluble. There generally is no limitation with respect to the type of hydrophobically modified polycarboxylic acid that may be used in this invention other than that the polycarboxylic acid can be used in a dishwashing composition. Such a hydrophobically modified polycarboxylic acid often has a weight average molecular weight of greater than about 175 and less than about 1.5 million, and preferably, greater than about 200 and less than about 1 million; and most preferably, greater than about 225 and less than about 750 thousand, including all ranges subsumed therein.

The preferred hydrophobically modified polycarboxylic acid which may be used in this invention comprises at least one structural unit of the formula:

(IV)

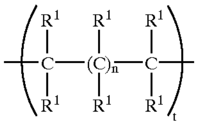

, and (V)

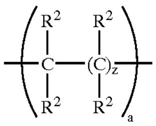

wherein each $R^1$ and $R^2$ are independently a hydrogen, hydroxy, alkoxy, carboxylic acid group, carboxylic acid salt, ester group, amide group, aryl, $C_{1-20}$ alkyl, $C_{2-20}$ alkenyl, $C_{2-20}$ alkynyl or a polyoxyalkylene condensate of an aliphatic group, n is an integer from about 0 to 8, z is an integer from about 1 to about 8, t is an integer from about 0 to about 2,000 and a is an integer from about 0 to about 2,000, with the proviso that a and t are not simultaneously 0 and at least one $R^1$ or one $R^2$ is a carboxylic acid group, or a salt thereof.

In a preferred embodiment, the hydrophobically modified polycarboxylic acid used in this invention comprises at least one structural unit represented by formula IV ($t \geqq 1$) with at least one $R^1$ as a carboxylic acid group (or salt thereof), and at least one structural unit represented by formula V ($a \geqq 1$) with at least one $R^2$ group as a $C_{4-20}$ alkyl group or a $C_{8-30}$ ethoxylated condensate of an aliphatic group.

In a most preferred embodiment, however, the modified polycarboxylic acid used in this invention comprises structural units represented by formula IV and structural units represented by formula V wherein a is from about 80% to about 120% of t, and at least two $R^1$ groups are carboxylic acid groups (or salts thereof) and at least one $R^2$ group is a methyl group and at least one $R^2$ group is a $C_5$ alkyl, and n is 0 and z is 1.

The hydrophobically modified polycarboxylic acids which may be used in this invention are typically prepared by reacting the desired precursors ($sp^2$ bonded monomers) under free radical polymerization conditions. Such polycarboxylic acids are also commercially available from suppliers like Rohm & Haas and DuPont. A more detailed description of the types of hydrophobically modified polycarboxylic acids which may be used in this invention, including the process for making the same, may be found in U.S. Pat. No. 5,232,622, the disclosure of which is incorporated herein by reference.

The preferred and most preferred hydrophobically modified polycarboxyiic acids are made available by Rohm & Haas under the names Acusol 820 and 460, respectively.

There is generally no limitation with respect to how much hydrophobically modified polycarboxylic acid may be used in this invention other than the amount used results in a dishwashing composition. Typically, however, from about 0.1 to about 10.0, and preferably, from about 0.2 to about 7.0, and most preferably from about 0.3 to about 5.0% by wt. of the dishwashing composition is a hydrophobically modified polycarboxylic acid, based on total weight of the dishwashing composition, including all ranges subsumed therein.

A surfactant (preferably having a cloud point in water of less than about 60° C.) may also be in this invention. These surfactants, which are typically nonionic, can be broadly defined as surface active compounds with at least one uncharged hydrophilic substituent. A major class of nonionic surfactants are those compounds produced by the condensation of alkylene oxide groups with an organic hydrophobic material which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements. Illustrative examples of various suitable nonionic surfactant types are polyoxyalkylene condensates of aliphatic carboxylic acids, whether linear- or branched-chain and unsaturated or saturated, especially ethoxylated and/or propoxylated aliphatic acids containing from about 8 to about 18 carbon atoms in the aliphatic chain and incorporating from about 2 to about 50 ethylene oxide and/or propylene oxide units. Suitable carboxylic acids include “coconut” fatty acids (derived from coconut oil) which contain an average of about 12 carbon atoms, “tallow” fatty acids (derived from tallow-class fats) which contain an average of about 18 carbon atoms, palmitic acid, myristic acid, stearic acid and lauric acid.

Other nonionic surfactants include polyoxyalkylene condensates of aliphatic alcohols, whether linear- or branched-chain and unsaturated or saturated, especially ethoxylated and/or propoxylated aliphatic alcohols containing from about 6 to about 24 carbon atoms and incorporating from about 2 to about 50 ethylene oxide and/or propylene oxide units. Suitable alcohols include “coconut” fatty alcohol, “tallow” fatty alcohol, lauryl alcohol, myristyl alcohol and oleyl alcohol. Preferred examples of such materials are provided by BASF Corporation as a series under the tradename Plurafac. Particularly preferred surfactants are Plurafac LF 301, Plurafac LF 403 and Plurafac SLF-18. Also included within this class of nonionic surfactants are epoxy capped poly(oxyalkylated) alcohols as described in WO 94/22800. A preferred example of this class of material is poly-tergent SLF 18B 45 made available by BASF Corporation.

Polyoxyethylene or polyoxypropylene condensates of alkyl phenols, whether linear- or branched-chain and unsaturated or saturated, containing from about 6 to 12 carbon atoms and incorporating from about 2 to about 25 moles of ethylene oxide and/or propylene oxide are other types of nonionic surfactants which may be used.

Other desired nonionic surfactants which may be used include polyoxyethylene-polyoxypropylene block copolymers having formulae represented as $$HO(CH_2CH_2O)_a(CH(CH_3)CH_2O)_b(CH_2CH_2O)_cH$$

or $$HO(CH(CH_3)CH_2O)_d(CH_2CH_2O)_e(CH(CH_3)CH_2O)_fH$$

wherein a, b, c, d, e and f are integers from 1 to 350 reflecting the respective polyethylene oxide and polypropylene oxide blocks of said polymer. The polyoxyethylene components of the block polymer constitute at least about 10% of the block polymer. The material preferably has a molecular weight of between about 1,000 and 15,000, more preferably from about 1,500 to about 6,000.

These materials are well known in the art. They are available as a series of products under the trademark “Pluronic” and “Pluronic R”, from the BASF Corporation.

The surfactants are typically present within the dishwashing composition at levels of at least 0.5 wt. %, preferably, 1–15 wt. %, and most preferably, 1.5 to 8 wt. %, based on the total weight of the dishwashing composition, including all ranges subsumed therein.

Water soluble compounds (including polymers) that reduce phosphate scale formation may also be used in the dishwashing composition of this invention. Such polymers often comprise at least one structural unit derived from a monomer having the formula:

(VI)

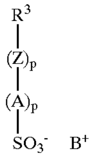

wherein $R^3$ is a group comprising at least one $sp^2$ bond, Z is O, N, P, S, or an amido or ester link, A is a mono- or a polycyclic aromatic group or an aliphatic group and each p is independently 0 or 1 and $B^+$ is a monovalent cation.

Preferably, $R^3$ is a $C_2$ to $C_6$ alkene (most preferably ethene or propene). When $R^1$ is ethenyl, Z is preferably amido, A is preferably a divalent butyl group, each p is 1, and $B^+$ is $Na^+$. Such a monomer is polymerized and sold as Acumer 3100 by Rohm & Haas.

Another preferred embodiment exists when the water soluble polymer is derived from at least one monomer with $R^3$ as 2-methyl-2-propenyl, Z as oxygen, A as phenylene, each p as 1 and $B^+$ as $Na^+$, and at least one monomer with $R^3$ as 2-methyl-2-propenyl, each p as 0 and $B^+$ as $Na^+$. Such monomers are polymerized and sold under the name Alcosperse 240 by Alco Chemical.

It is further noted herein that it is within the scope of this invention for all the polymers used to be a homopolymer or copolymer, including terpolymers. Furthermore, the polymers of this invention may be terminated with conventional termination groups resulting from precursor monomers and/or initiators that are used.

There is generally no limitation with respect to how much water soluble polymer that reduces phosphate scale formation is used in this invention as long as the amount used results in a dishwashing composition. Often, from about 0.5 to about 10.0, and preferably, from about 1.0 to 7.0, and most preferably, from about 1.5 to about 4.5% by weight water soluble polymer is used, based on total weight of the dishwashing composition, including all ranges subsumed therein. These water soluble polymers typically have a weight average molecular weight from about 1,000 to about 50,000.

It is also within the scope of this invention to employ compounds that may be used to reduce carbonate scale formation. These compounds include polyacrylates (and copolymers thereof) having a weight average molecular weight from about 1,000 to about 400,000. Such compounds are supplied by Rohm and Haas, BASF, and Alco Corp. Preferred copolymers include those derived from acrylic acid and maleic acid monomers like Sokalan CP5 and CP7 supplied by BASF, and Acusol 479N, supplied by Rohm & Haas. Copolymers of acrylic acid and methacrylic acid (Colloid 226/35), as supplied by Rhone-Poulenc, may also be used.

Other materials that may be used to reduce carbonate scale formation include phosphonate functionalized acrylic acid (Casi 773 as supplied by Buckman laboratories); copolymers of maleic acid and vinyl acetate, and terpolymers of maleic acid, acrylic acid and vinyl acetate (made commercially by Huls); polymaleates (like Belclene 200, as supplied by FMC); polymethacrylates, (like Tomal 850, as supplied by Rohm & Haas); polyaspartates; ethylene diamine disuccinate, organopolyphosphonic acids (and salts thereof) such as sodium salts of amino tri (methylenephosphonic acid), diethylene triamine penta (methylene phosphonic acid); hexamethylene diamine tetramethylene phosphonic acid; ethane 1-hydroxy-1,1-diphosphonic acid (HEDP); organomonophosphonic acids (and salts thereof) such as the sodium salt of 2-phosphono-1,2,4-butane tricarboxylic acid, all of which are sold under the Dequest line as supplied by Solutia. Phosphates, especially alkali metal tripolyphosphates may also be used as well as mixtures of the above-described materials. It has also been found that combinations of anti-scalling agents can be more effective at reducing calcium carbonate scale than individual anti-scaling agents themselves.

The materials that may be used to reduce carbonate scale formation typically make up from about 0.01% to about 10.0%, and preferably, from about 0.1% to about 6.0%, and most preferably, from about 0.2% to about 5.0% by weight of the total weight of dishwashing composition, including all ranges subsumed therein.

Any conventional dishwashing builders may be used in this invention. Non-phosphate containing builders such a alkali metal salts of polycarboxylic acids may be used (e.g., sodium citrate, iminodisuccinates, oxydisuccinate). Phosphate containing builders may also be used. An illustrative list of the phosphate builders which may be used in this invention include sodium, potassium and ammonium pyrophosphate; alkali metal tripolyphosphates, sodium and potassium orthophosphate and sodium polymetaphosphate, with alkali metal salts of tripolyphosphates being especially preferred. Such builders typically make up from about 5.0 to about 75.0% by weight of the total weight of the dishwashing composition, including all ranges subsumed therein. Preferably, however, the amount of phosphate containing builder employed is from about 10.0 to about 70.0, and most preferably, from about 15.0 to about 65.0% by weight based on total weight of the dishwashing composition and including all ranges subsumed therein.

Other additives which may be used in this invention include well known items such as perfumes, antifoaming agents, anti-tarnish agents, lime soap dispersants, disintegrants, and processing aids (e.g., polyethylene glycol) which aid in forming tablet-type dishwashing compositions. Such additives, collectively, do not normally make up more than about 8.0% by weight of the total weight of the dishwashing composition.

It is also within the scope of this invention to use conventional dishwashing bleaches and activators (e.g., from about 0.02 wt. % to about 20.0 wt. % based on total weight of the dishwashing composition). Such bleaches include inorganic and organic peracids as well as salts thereof. Examples include epsilon phthalimido perhexanoic acid and Oxone®, respectively. Moreover, such bleaches may be encapsulated with, for example, a paraffin wax as disclosed in U.S. Pat. No. 5,230,822.

Other bleaches which may be used in this invention include hydrogen peroxide and its precursors (e.g., sodium perborate and sodium percarbonate).

If desired, conventional bleach activators (including catalysts) may be used with the bleaches described herein. These activators include N,N,N',N'-tetraacetylethylenediamine, nonanoyloxybenzenesulfonate, cationic nitriles, cholyl (4-sulfophenyl)carbonate, and quaternary imine salts (e.g., N-methyl-3,4-dihydroisoquinolinium p-toluenesulfonate).

Other bleach activators which may be used include transition metal-containing bleach catalysts such as $[Mn^{IV}{}_2(\mu\text{-}0)_3(Me_3TACN)_2](PF_6)_2$ (as described in U.S. Pat. Nos. 4,728,455, 5,114,606, 5,153,161, 5,194,416, 5,227,084, 5,244,594, 5,246,612, 5,246,621, 5,256,779, 5,274,147, 5,280,117), $[Fe^{II}(MeN4py)(MeCN)](ClO_4)_2$ (as described in EP 0 909 809) and $[Clo^{III}(NH_3)^5(OAc)](OAc)_2$ (as described in U.S. Pat. No. 5,559,261, WO 96/23869, WO 96/23860, WO 96/23861), the disclosures of which are incorporated heiein by reference. Bleach scavengers, like sodium sulfite, may also be used in the dishwashing compositions of this invention.

It is also within the scope of this invention to employ conventional dishwashing buffers. The buffers typically make up from about 5.0 to about 25.0% by weight of the total weight of the dishwashing composition and include well known buffers like sodium disilicate, sodium metasilicate, sodium bicarbonate and sodium carbonate.

In addition to the enzymes described above, it is within the scope of this invention to employ conventional amylases and/or lipases with the dishwashing compositions of this invention. Such amylases include Termamyl and Duramyl (Novozymes A/S), and Purastar ST and Purastar OxAm (Genencor). The lipases which may be used include, for example, Lipolase as made available by Novozymes A/S. In general, the total amount of conventional enzymes used in this invention is from about 0.0002 to about 2.0% by weight of pure enzyme, based on total weight of dishwashing composition. If desired, enzyme stabilizers, like glycerol and borate containing compounds, may also be used in the dishwashing composition of this invention as well as thickening agents such as Carbopol 627 (as supplied by B.F. Goodrich).

When washing protein soiled items, like dishware and utensils, with the dishwashing composition of this invention, soiled items are typically placed in a conventional domestic or commercial dishwashing machine as is the dishwashing composition of this invention (in no particular order). The dishwashing composition, in the form of a liquid, powder, paste, gel or dishwashing tablet, then dissolves in the water of the dishwasher to wash the items. The typical dishwashing cycle is from about 10 minutes until about 60 minutes and the typical temperature of the water in the dishwasher is from about 40° C. to about 70° C. The glassware and utensils resulting from the above-described cleaning method are clean and have an excellent appearance (i.e., substantially free of protein-comprising soils, spots and film). Such results are unexpectedly obtained even when the pH of the dishwashing solution is below the pH that is typically recommended for maximum serine protease activity.

The Examples below are provided to further illustrate an understanding of the present invention, and they are not intended to limit the scope of the invention as set forth in the claims.

A standard liquid dishwashing detergent base was prepared by mixing the following components:

| Component | % by Weight |
|---|---|
| Water | 46.9 |
| Carbopol 627 | 1.5 |
| Potassium Tripolyphosphate | 30.8 |
| Glycerol | 6.2 |
| KOH | 0.84 |
| Sokalan CP7 | 5.1 |
| Sodium sulfite | 0.19 |
| Plurafac LF 403 | 2.06 |

A separate enzyme component was prepared as follows:

| Component | % by Weight |
|---|---|
| Encapsulated bleach (peroxyacid within paraffin wax) | 4.4 |
| Termamyl ® | 2.0 |
| Protease | as described in Examples |

The dishwashing examples were carried out using five sets of soiled dishware to simulate actual dishwashing conditions. A Bauknecht (55° C. normal cycle) machine was used and charged with 4 egg-soiled stainless steel plates, 4 egg-soiled, 4 wheat-soiled, 4 roux-soiled and 4 potato-starch soiled ceramic plates. Each plate was prepared by applying about 2.0 g of soil to the surface and then baking at 60° C. for about 2 hours. Water hardness was maintained at 300 ppm total hardness ($Ca^{2+}$: $Mg^{2+}$=4:1) and 320 ppm temporary hardness (expressed as $NaHCO_3$). The detergent base and enzyme component were dosed at the time of machine dispenser cup opening. The egg-soiled stainless steel plates were visually scored on a 0–100% residual soil basis.

Enzyme Activity Calculation: Enzyme activity for Savinase is calculated based on the reported activity from Novozymes, which is 6 T (6KNPU/g) for the granular form (Equation 1) and 16L (16 KNPU/mL) for the liquid form of Savinase (Equation 2), using the equation below where 5000 mL is the volume of the wash, and V is the volume of liquid enzyme added, and wt. is the weight of granular enzyme added. The non-Savinase serine protease activities were calculated based on their activity relative to Savinase in a di-methyl-casein assay using the Cobas Mira Plus (Roche Diagnostics).

$$\frac{\left([V\ (\text{mL})]\left[Activity\left(\frac{KNPU}{\text{mL}}\right)\right]\left[250{,}000\frac{GU}{KNPU}\right]\right)}{5000\ \text{mL}} \quad (1)$$

$$\frac{\left([wt\ (\text{g})]\left[Activity\left(\frac{KNPU}{\text{g}}\right)\right]\left[250{,}000\frac{GU}{KNPU}\right]\right)}{5000\ \text{mL}} \quad (2)$$

Enzyme activity for Neutrase is calculated based on the equation below where 5000 mL is the volume of the wash, and V is the volume of liquid enzyme added and wt (g) is the amount of granular enzyme added. The reported activity from Novozymes for Neutrase is 1.5 MG (1.5 AU/g) for the granular form (Equation 3) and 0.8L (0.8 AU/mL) for the liquid form of Neutrase (Equation 4).

$$\frac{\left([V\ (\text{mL})]\left[Activity\left(\frac{AU}{\text{mL}}\right)\right]\left[733{,}000\frac{GU}{AU}\right]\right)}{5000\ \text{mL}} \quad (3)$$

$$\frac{\left([wt\ (\text{g})]\left[Activity\left(\frac{AU}{\text{g}}\right)\right]\left[733{,}000\frac{GU}{AU}\right]\right)}{5000\ \text{mL}} \quad (4)$$

Enzyme activity for the Corolase was based on the measured activity in a di-methyl-casein assay relative to Neutrase. AU=Anson Unit; GU=Glycine Unit; KNPU=Kilo Novo Protease Unit. Activity, as shown in the examples scales linearly with the amount of enzyme added.

EXAMPLES 1–18

In examples 1–18, the two left columns give the volume (micro liter) or weight (g) of protease added into the wash liquor via the enzyme component described above. The third column shows the total maximum calculated protease activity in the wash, either from an individual protease or combination of proteases. The fourth column lists the amount of residual egg soil left on stainless steel plates after washing with the indicated protease system. A low value in this column suggests a good protease system and excellent protein-comprising soil removal.

| | (μL) Savinase 16 L | (μL) Neutrase 0.8 L | Activity (GU/mL) | % Residual Egg (Stainless steel) |
|---|---|---|---|---|
| 1 | 110 | 0 | 88 | 95 |
| 2 | 0 | 1000 | 117 | 85 |
| 3 | 55 | 250 | 73 | 16 |

| | (μL) Relase 16 L | (μL) Neutrase 0.8 L | Activity (GU/mL) | % Residual Egg (Stainless steel) |
|---|---|---|---|---|
| 4 | 230 | 0 | 184 | 95 |
| 5 | 0 | 2000 | 235 | 65 |
| 6 | 110 | 500 | 147 | 30 |

| | (μL) Purafect 4000 L | (μL) Properase 1600 L | (μL) Neutrase 0.8 L | Activity (GU/mL) | % Residual Egg (S. Steel) |
|---|---|---|---|---|---|
| 7 | 200 | 120 | 0 | 228 | 68 |
| 8 | 0 | 0 | 2000 | 235 | 65 |
| 9 | 100 | 60 | 500 | 172 | 6 |

| | (μL) Savinase 16 L | (μL) Corolase 7089 | Activity (GU/mL) | % Residual Egg (Stainless steel) |
|---|---|---|---|---|
| 10 | 230 | 0 | 184 | 82 |
| 11 | 0 | 500 | 117 | 65 |
| 12 | 55 | 250 | 103 | 16 |

| | (g) Savinase 6 T | (μL) Neutrase 0.8 L | Activity (GU/mL) | % Residual Egg (Stainless steel) |
|---|---|---|---|---|
| 13 | 1.0 | 0.0 | 300 | 60 |
| 14 | 0.0 | 2000 | 235 | 65 |
| 15 | 0.5 | 500 | 209 | 23 |

| | (g) Savinase 6 T | (g) Neutrase 1.5 MG | Activity (GU/mL) | % Residual Egg (Stainless steel) |
|---|---|---|---|---|
| 16 | 0.5 | 0.0 | 150 | 90 |
| 17 | 0.0 | 0.53 | 117 | 80 |
| 18 | 0.25 | 0.13 | 104 | 66 |

The data in the examples above demonstrates that the combination of serine protease and metallo-protease, as described in this invention, unexpectedly results in excellent protein-comprising soil removal.

What is claimed is:

1. A dishwashing composition having enhanced protein soil removal ability for removing protein comprising soil from soiled items comprising:

(a) a serine protease; and (b) a metallo-protease wherein the ratio of serine protease to metallo-protease is from about 75:1 to about 1:75;

wherein the metallo-protease has an enzyme activity from about 0.001 to less than 15 AU/mg caseinolytic activity;

wherein the pH of said composition is from about 5.0 to about 10.0.

2. The dishwashing composition according to claim 1 wherein the serine protease and the metallo-protease have a combined measured activity that is less than or equal to a sum of serine protease measured activity plus metallo-protease activity.

3. The dishwashing composition according to claim 1 wherein the dishwashing composition further comprises a polymer comprising a positive charge and at least one additive selected from the group consisting of a water soluble compound that reduces phosphate scale formation and a compound that reduces carbonate scale formation.

4. The dishwashing composition according to claim 1 wherein the dishwashing composition further comprises:

(a) an anti-spotting agent comprising a hydrophobically modified polycarboxylic acid, a surfactant having a cloud point in water of less than about 60° C., or both; and (b) a water soluble compound that reduces phosphate scale formation, a compound that reduces carbonate scale formation, or both.

5. The dishwashing composition according to claim 1 wherein the dishwashing composition further comprises an amylase, or a lipase, or both.

6. The dishwashing composition according to claim 1 wherein the serine protease has a maximum activity at a pH from about 7.0 to about 11.5, and the metallo-protease has a maximum activity at a pH from about 5.0 to about 10.0.

7. The dishwashing composition according to claim 1 wherein the dishwashing composition is a powder, tablet, paste, liquid or gel.

8. The dishwashing composition according to claim 1 wherein the dishwashing composition is a machine dishwashing composition, an industrial dishwashing composition or a hand dishwashing composition.

9. A method for removing a protein-comprising soil from a soiled item comprising the steps of:

(a) contacting a soiled item with a composition comprising:

i) a serine protease; and ii) a metallo-protease; wherein the ratio of serine protease to metallo-protease is from about 75:1 to about 1:75; wherein the metallo-protease has an enzyme activity from about 0.001 to less than 15 AU/mg caseinolytic activity; wherein the pH of said composition is from about 5.0 to about 10.0; and (b) washing the soiled item with the composition.

10. The method for removing a protein-comprising soil from a soiled item according to claim 9 wherein the composition is a dishwashing composition and the soiled item is dishware or a kitchen utensil.

11. The method for removing a protein-comprising soil from a soiled item according to claim 9 wherein the dishwashing composition further comprises a polymer comprising a positive charge and at least one additive selected form the group consisting of a water soluble compound that reduces phosphate scale formation and a compound that reduces carbonate scale formation.

12. The method for removing a protein-comprising soil from a soiled item according to claim 9 wherein the dishwashing composition further comprises (a) an anti-spotting agent comprising a hydrophobically modified polycarboxylic acid, a surfactant having a cloud point in water of less than about 60° C., or both; and (b) a water soluble compound that reduces phosphate scale formation, a compound that reduces carbonate scale formation, or both.

13. The method for removing a protein-comprising soil from a soiled item according to claim 9 wherein the dishwashing composition further comprises an amylase, or a lipase, or both.

14. The method for removing a protein-comprising soil from a soiled item according to claim 9 wherein the dishwashing composition is a powder, tablet, paste, liquid or gel.

15. The method for removing a protein-comprising soil from a soiled item according to claim 9 wherein the dishwashing composition is a machine dishwashing composition, an industrial dishwashing composition or a hand dishwashing composition.

* * * * *